US012746915B2

(12) United States Patent
Ma et al.

(10) Patent No.: US 12,746,915 B2
(45) Date of Patent: Sep. 29, 2026

(54) REAL-TIME RISK REASONING

(71) Applicant: Toyota Motor Engineering & Manufacturing North America, Inc., Plano, TX (US)

(72) Inventors: Yunsheng Ma, West Lafayette, IN (US); Amr Abdelraouf, Mountain View, CA (US); Rohit Gupta, Santa Clara, CA (US); Kyungtae Han, Palo Alto, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 15 days.

(21) Appl. No.: 18/964,886

(22) Filed: Dec. 2, 2024

(65) Prior Publication Data

US 2026/0152175 A1 Jun. 4, 2026

(51) Int. Cl.
*B60W 30/09* (2012.01)

(52) U.S. Cl.
CPC .................................. *B60W 30/09* (2013.01)

(58) Field of Classification Search
None
See application file for complete search history.

(56) References Cited

U.S. PATENT DOCUMENTS 9,791,864 B2 10/2017 Lei et al.
10,252,729 B1 4/2019 Goldman-Shenhar
11,287,817 B1 3/2022 Urmson et al.
11,578,990 B1 2/2023 Chintakindi et al.
11,714,971 B2 8/2023 Wray et al.
11,878,707 B2 1/2024 Lu et al.
11,898,865 B1 2/2024 Bhavsar et al.
11,987,266 B2 5/2024 Watts et al.
12,535,780 B1 * 1/2026 Pronovost .......... G05B 13/0265
2020/0310449 A1 10/2020 Nedunuri et al.
2022/0319308 A1 10/2022 Jalali
2022/0371622 A1 11/2022 Malla
2022/0402483 A1 * 12/2022 Harai ...................... G08G 1/00
2023/0117467 A1 4/2023 Miucic et al.
2024/0101157 A1 * 3/2024 Pronovost ................ G06N 3/04
2025/0002032 A1 * 1/2025 Kentley-Klay ..... G06F 18/2413
(Continued)

OTHER PUBLICATIONS

Tian et al., "Tokenize theWorld into Object-level Knowledge to Address Long-tail Events in Autonomous Driving", Jul. 1, 2024 (Year: 2024).*
(Continued)

*Primary Examiner* — Amelia Vorce
(74) *Attorney, Agent, or Firm* — Christopher G. Darrow; Darrow Mustafa PC

(57) ABSTRACT

Systems, methods, and other embodiments described herein relate to real-time risk reasoning within a vehicle. In one embodiment, a method includes acquiring sensor data about a surrounding environment of a vehicle. The method includes, responsive to identifying a risk to the vehicle from the sensor data, merging tokens that are features extracted from the sensor data into a condensed representation of a context of the surrounding environment associated with the risk. The method includes providing a driving recommendation according to the risk.

20 Claims, 7 Drawing Sheets

(56) References Cited

U.S. PATENT DOCUMENTS

| | | | | |
|---|---|---|---|---|
| 2025/0069410 | A1* | 2/2025 | Grazioli | G06V 10/22 |
| 2025/0103779 | A1* | 3/2025 | Zhang | B60W 50/0097 |
| 2025/0139495 | A1* | 5/2025 | Davis | G06N 20/00 |
| 2025/0299059 | A1* | 9/2025 | Ahmed | G06N 3/045 |
| 2025/0384051 | A1* | 12/2025 | Frank | G06F 16/24578 |
| 2026/0008479 | A1* | 1/2026 | Li | B60W 60/001 |
| 2026/0017372 | A1* | 1/2026 | Liébana De La Barrera | G06F 21/566 |
| 2026/0086562 | A1* | 3/2026 | Song | G05D 1/43 |

OTHER PUBLICATIONS

Zhang et al., “RAGTraffic: Utilizing Retrieval-Augmented Generation for Intelligent Traffic Signal Control”, 2024 International Annual Conference on Complex Systems and Intelligent Science (CSIS-IAC) Sep. 20-22, 2024, Guangzhou, China (Year: 2024).*

Liu, et al., “CoRA: Collaborative Information Perception by Large Language Model’s Weights for Recommendation”, arXiv preprint arXiv:2408.10645, 2024, 10 pages.

Peng, et al., “LC-LLM: Explainable Lane-Change Intention and Trajectory Predictions with Large Language Models”, arXiv preprint arXiv:2403.18344, 2024, 13 pages.

Wan, et al., “LOOK-M: Look-Once Optimization in KV Cache for Efficient Multimodal Long-Context Inference”, arXiv preprint arXiv:2406.18139, 2024, 12 pages.

* cited by examiner

REAL-TIME RISK REASONING

TECHNICAL FIELD

The subject matter described herein relates, in general, to improving vehicle safety by identifying risks and, more particularly, to providing a driver with feedback to facilitate awareness and better driving behaviors.

BACKGROUND

The modern landscape of vehicular technology is marked by a rapid evolution in Advanced Driver Assistance Systems (ADAS) and the advent of autonomous driving technologies. These systems aim to enhance driving safety and comfort by assisting drivers in various tasks, including lane-keeping, adaptive cruise control, collision avoidance, parking assistance, and so on. Despite these advancements, current ADAS are predominantly rule-based, relying heavily on human-designed algorithms that prescribe specific actions based on pre-defined situations. This rigidity can result in limitations, as such systems may lack adaptability to handle the wide range of dynamic, unpredictable, and complex scenarios encountered on the road.

Manual driving requires humans to apply a deep reservoir of knowledge and real-world experiences, including an understanding of social cues, weather conditions, and road conditions, all of which influence how they react in various situations. For example, drivers anticipate potential hazards based on subtle visual or contextual cues, make judgments in uncertain environments, and adjust their driving style according to the behavior of other road users. This knowledge is highly situational and often difficult to encode into rigid, rule-based ADAS. However, these automated systems may fail to enhance the awareness and understanding of the driver, which can lead to a lack of understanding on the part of the driver about actions taken by the automated systems and awareness about how to use the systems to improve safety.

SUMMARY

Example systems and methods relate to a manner of real-time risk reasoning within a vehicle. As previously noted, automated driving systems are becoming more common within vehicles but may not provide intuitive interactions with drivers and may be constrained to rule-based approaches that can lack adaptability. Thus, even though automated systems such as ADAS can improve overall safety, these systems may not improve driving habits of a user or awareness of the user about the systems, which can lead to the driver failing to trust the automated systems and also not improving driving habits.

The present approach aims to address these challenges by providing real-time recommendations to drivers on how to better control the vehicle, considering the dynamic context of each driving situation. Additionally, the system can provide drivers with insights into control decisions made by automated systems when in autonomous or semi-autonomous driving modes. This approach is designed to foster trust in automated systems, promote safe driving habits, and offer a bridge between human intuition and machine-guided decision-making, helping drivers to navigate complex scenarios with greater confidence and safety.

For example, in one approach, an inventive system may leverage multi-modal large language models and a cloud-based architecture to facilitate a tailored analysis of risks in order to provide driving recommendations and/or explanations to the driver. Consider that the vehicle includes sensors, such as cameras that capture information about a surrounding environment. The system, in at least one approach, acquires images from the camera(s) and processes the images using a context model, such as a machine learning algorithm. The context model outputs features that represent a context of the current environment (e.g., objects, spatial relationships between objects, etc.). The system can then use a risk model, which may also be a machine-learning model, to assess the features for risks. The risks may be varied but can include, for example, anything that may influence operation of the vehicle (e.g., causes braking) and/or a safety of the vehicle and passengers therein.

When the system detects a risk, the system may offload processing of the collected information to a cloud-based instance. Utilizing the cloud-based instance of the system permits the system to implement more powerful processing routines. In particular, the system implements a multi-modal large language model (MLLM) along with, for example, chain-of-thought (CoT) reasoning to provide a focused analysis that generates a driving recommendation specific to the dynamic context of the vehicle. The cloud can then communicate the driving recommendation back to the vehicle, which provides the driving recommendation in order to improve control and/or understanding by the driver. In this way, the system can improve control and awareness on the part of the driver.

In one embodiment, a risk system is disclosed. The risk system includes one or more processors and a memory communicably coupled to the one or more processors. The memory stores a control module including instructions that, when executed by the one or more processors, cause the one or more processors to acquire sensor data about a surrounding environment of a vehicle. The control module includes instructions to, responsive to identifying a risk to the vehicle from the sensor data, merge tokens that are features extracted from the sensor data into a condensed representation of a context of the surrounding environment associated with the risk. The control module includes instructions to provide a driving recommendation according to the risk.

In one embodiment, a non-transitory computer-readable medium including instructions that, when executed by one or more processors, cause the one or more processors to perform one or more functions is disclosed. The instructions include instructions to acquire sensor data about a surrounding environment of a vehicle. The instructions include instructions to, responsive to identifying a risk to the vehicle from the sensor data, merge tokens that are features extracted from the sensor data into a condensed representation of a context of the surrounding environment associated with the risk. The instructions include instructions to provide a driving recommendation according to the risk.

In one embodiment, a method is disclosed. In one embodiment, the method includes acquiring sensor data about a surrounding environment of a vehicle. The method includes, responsive to identifying a risk to the vehicle from the sensor data, merging tokens that are features extracted from the sensor data into a condensed representation of a context of the surrounding environment associated with the risk. The method includes providing a driving recommendation according to the risk.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
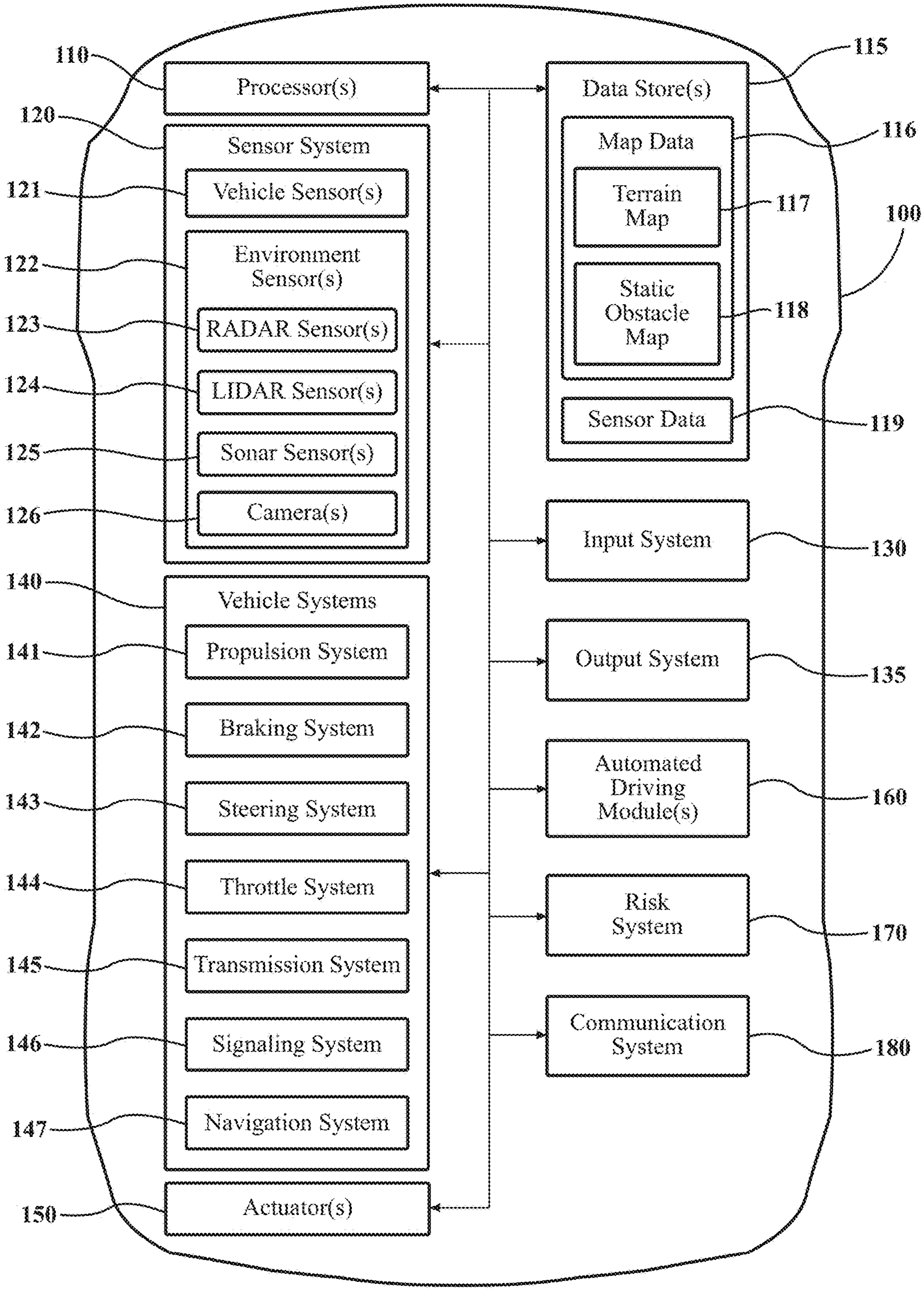
FIG. 1 illustrates one embodiment of a vehicle within which systems and methods disclosed herein may be implemented.

Systems, methods, and other embodiments associated with real-time risk reasoning within a vehicle are disclosed. As previously noted, automated driving systems are becoming more common within vehicles but may not provide intuitive interactions with drivers and may be constrained to rule-based approaches that can lack adaptability. Thus, even though automated systems such as ADAS can improve overall safety, these systems may not improve driving habits of a user or awareness of the user about the systems, which can lead to the driver failing to trust the automated systems and also not improving driving habits.

Therefore, in at least one approach, an inventive system may leverage multi-modal large language models (MLLMs) and a cloud-based architecture to facilitate a tailored analysis of risks in order to provide driving recommendations and/or explanations to the driver. Consider that the vehicle includes sensors, such as cameras that capture information about a surrounding environment. The system, in at least one approach, acquires images from the camera and processes the images using a context model, such as a machine learning algorithm. The context model outputs features that represent a context of the current environment (e.g., objects, spatial relationships between objects, etc.). From the feature representation, the system can then use a risk model, which may also be a machine-learning model, to assess the features for risks. The risks may be varied but can include, for example, anything that may influence operation of the vehicle and/or a safety of the vehicle and passengers therein.

When the system detects a risk, the system may offload processing of the collected information to a cloud-based instance. That is, because computing resources at the vehicle can be limited due to, for example, the nature of a mobile platform, the system can provide the features to the cloud-based instance of the system in order to perform a more in-depth analysis where resources are not limited in the same way. To achieve this, the system can, for example, merge tokens. The tokens are generally the features that have been extracted from the sensor data. To merge the tokens, the system can identify redundant elements within the same frame and also between frames where a frame is generally a separate observation of the scene at a distinct time step. Thus, the system is able to compress a representation of the scene through merging of the tokens, thereby providing for more efficient communication of the information to the cloud.

Utilizing the cloud-based instance of the system permits the system to implement more powerful processing routines. In particular, the system implements, in at least one approach, a multimodal large language model (MLLM) along with, for example, chain-of-thought (CoT) reasoning to provide a focused analysis that generates a driving recommendation specific to the dynamic context of the vehicle. In particular, the cloud-based system uses CoT reasoning to formulate queries to the MLLM in a focused manner that relates to the specific scene. The MLLM is also comprised of additional components, such as a retrieval-augmented generation (RAG) element that functions to acquire insights about the scene from a long-term memory. For example, the MLLM implements the RAG element in a manner that uses the tokens to query a long-term memory. The long-term memory includes prior occurrences of different scenarios that are indexed based on various key values derived from the tokens. Thus, the RAG element permits retrieval of information about the vehicle previously responded in similar conditions.

As such, the RAG element can acquire these "memories" of prior occurrences similar to a present occurrence in order to inform the MLLM. Thus, the MLLM can then process the tokens along with the memories of prior occurrences to make a more informed decision about how to proceed. That is, the MLLM can generate a driving recommendation to the driver or an explanation of an automated driving action based on the memories and the tokens. The cloud can then communicate the driving recommendation back to the vehicle, which provides the driving recommendation in order to improve control and/or understanding by the driver. In this way, the system can improve control and awareness on the part of the driver.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any device that, for example, transports passengers. In various approaches, the vehicle 100 may be an automated vehicle. The vehicle 100 may operate manually, autonomously, semi-autonomously, or with the assistance of various advanced driving assistance systems (ADAS). Further, the vehicle 100 is generally a connected vehicle that is capable of communicating wirelessly with other devices, such as cloud-computing elements. Moreover, while the present disclosure is generally described in relation to the vehicle 100, in yet further approaches, the noted systems and methods disclosed herein may be implemented as part of other entities, such as electronic devices that are not associated with a particular form of transport but are instead embedded as part of a mobile electronic device that can be, for example, carried by an individual and that may function independently or in concert with additional systems of other devices.

In any case, the vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within the vehicle 100, while further components of the system are implemented within a cloud-based environment, as discussed further subsequently.

Some of the possible elements of the vehicle 100 are shown in FIG. 1 and will be described along with subsequent figures. However, a description of many of the elements in FIG. 1 will be provided after the discussion of FIGS. 2-7 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 1, the vehicle 100 includes a risk system 170 that is implemented to perform methods and other functions as disclosed herein relating to determining risks associated with the vehicle 100 and providing driving recommendations to improve driver awareness and control.

Moreover, the risk system 170, as provided for within the vehicle 100, functions in cooperation with a communication system 180. In one embodiment, the communication system 180 communicates according to one or more communication standards. For example, the communication system 180 can include multiple different antennas/transceivers and/or other hardware elements for communicating at different frequencies and according to respective protocols. The communication system 180, in one arrangement, communicates via a communication protocol, such as a WiFi, DSRC, V2I, V2V, or another suitable protocol for communicating between the vehicle 100 and other entities in the cloud environment. Moreover, the communication system 180, in one arrangement, further communicates according to a protocol, such as the global system for mobile communication (GSM), Enhanced Data Rates for GSM Evolution (EDGE), Long-Term Evolution (LTE), 5G, or another communication technology that provides for the vehicle 100 communicating with various remote devices (e.g., a cloud-based server). In any case, the risk system 170 can leverage various wireless communication technologies to provide communications to other entities, such as members of the cloud-computing environment.

Figure 2:
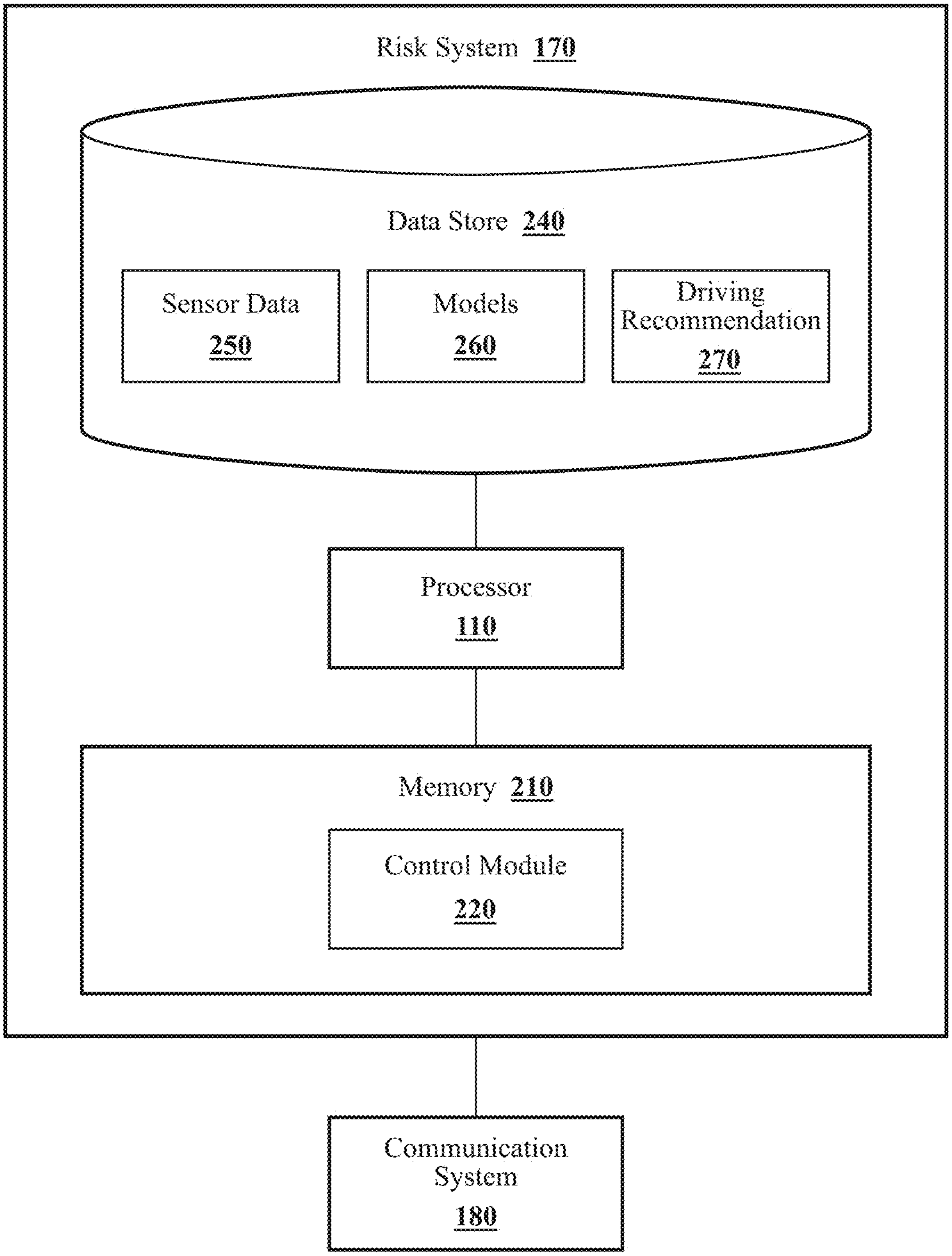
FIG. 2 illustrates one embodiment of a risk system associated with real-time risk reasoning.

With reference to FIG. 2, one embodiment of the risk system 170 is further illustrated. The risk system 170 is shown as including a processor 110 from the vehicle 100 of FIG. 1. Accordingly, the processor 110 may be a part of the risk system 170, the risk system 170 may include a separate processor from the processor 110 of the vehicle 100 or the risk system 170 may access the processor 110 through a data bus or another communication path. In further aspects, the processor 110 is a cloud-based resource. Thus, the processor 110 may communicate with the risk system 170 through a communication network or may be co-located with the risk system 170. In one embodiment, the risk system 170 includes a memory 210 that stores a control module 220. The memory 210 is a random-access memory (RAM), read-only memory (ROM), a hard-disk drive, a flash memory, or other suitable memory (either volatile or non-volatile) for storing the module 220 and/or other information used by the risk system 170. The module 220 is, for example, computer-readable instructions within the physical memory 210 that, when executed by the processor 110, cause the processor 110 to perform the various functions disclosed herein.

Figure 3:
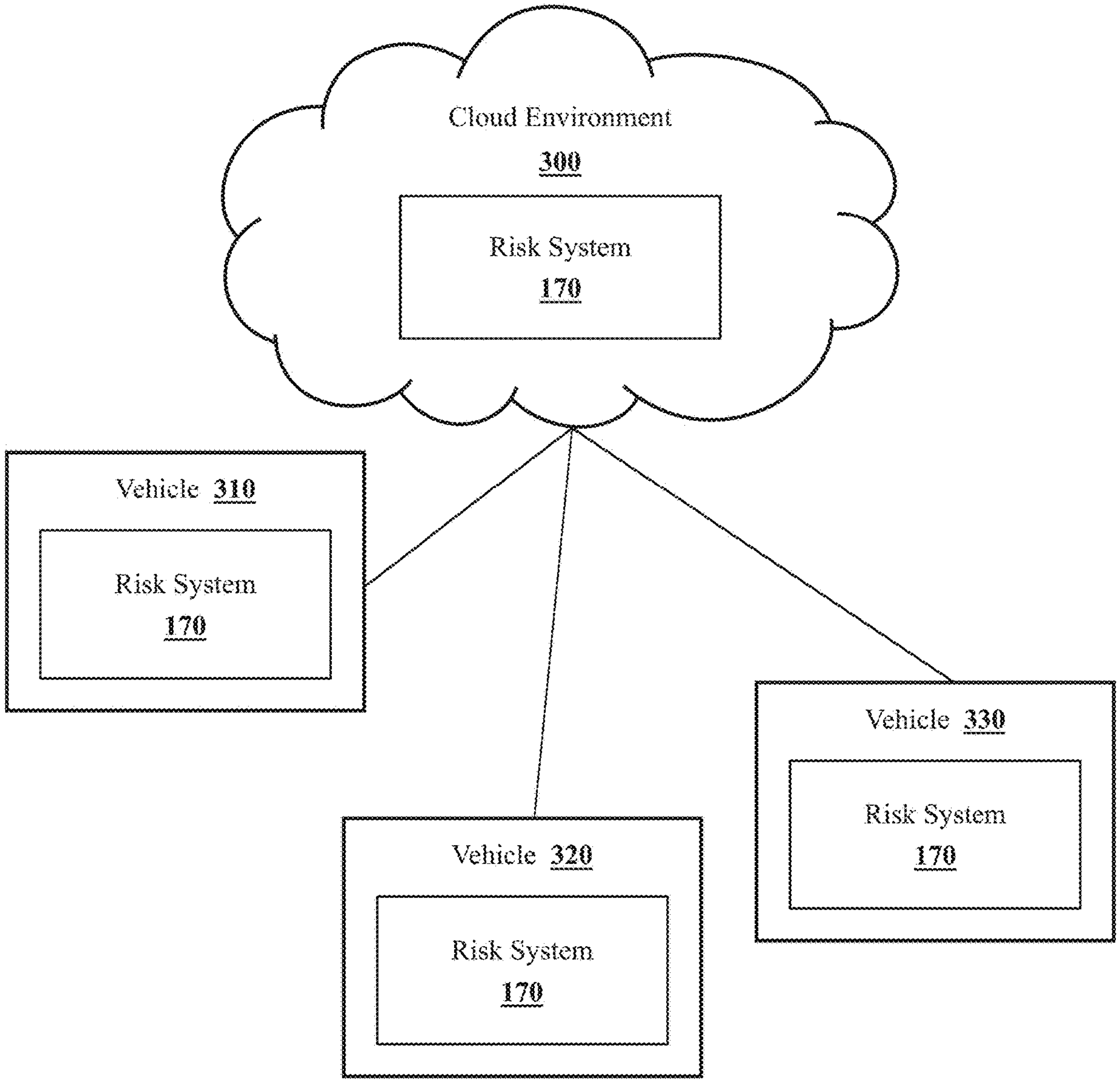
FIG. 3 illustrates a diagram of a risk system within a cloud-computing environment.

As previously noted, the risk system 170 may be further implemented within the vehicle 100 as part of a cloud-based system that functions within a cloud environment 300, as illustrated in relation to FIG. 3. That is, for example, the risk system 170 may acquire data (e.g., telematics data, sensor data, etc.) from various entities, such as distributed vehicles implementing separate instances of the risk system 170. In one or more approaches, the cloud environment 300 may facilitate communications between multiple different entities, including one or more of vehicles 310, 320, and 330 and a cloud-based server within the cloud environment 300.

Accordingly, as shown, the risk system 170 may include separate instances within one or more entities of the cloud-based environment 300, such as servers, and also instances within vehicles that function to acquire, analyze, and distribute the noted information. In a further aspect, the entities that implement the risk system 170 within the cloud-based environment 300 may vary beyond transportation-related devices and encompass mobile devices (e.g., smartphones), and other such devices that may be carried by an individual within a vehicle, and thereby can function in cooperation with the vehicle. Thus, the set of entities that function in coordination with the cloud environment 300 may be varied.

Continuing with FIG. 2 and a general embodiment of the risk system 170, in one or more arrangements, the risk system 170 includes a data store 240. The data store 240 is, in one embodiment, an electronic data structure (e.g., a database) stored in the memory 210 or another electronic memory and that is configured with routines that can be executed by the processor 110 for analyzing stored data, providing stored data, organizing stored data, and so on. Thus, in one embodiment, the data store 240 stores data used by the module 220 in executing various functions. In one embodiment, the data store 240 includes the data 250, models 260, a map 270, and/or other information that is used by the module 220. It should be appreciated that while the data store 240 is shown as including the sensor data 250, the models 260, and the driving recommendation 270, separate instances of the risk system 170 may implement the data store 240 to include different sets of information (e.g., tokens, memories of prior determinations, merged tokens, etc.).

In any case, the control module 220 includes instructions that function to control the processor 110 to acquire the sensor data 250 about a surrounding environment of the vehicle 100. The risk system 170 captures observations of the surrounding environment in the form of the sensor data 250 that the risk system 170 can process into observations that are processed into features specifying objects, spatial relationships, etc.

Accordingly, the control module 220 generally includes instructions that cause the processor 110 to control one or more sensors of the vehicle 100 to generate observations about the surrounding environment. Broadly, an observation, as acquired by the control module 220, is information about a particular driving environment (e.g., roadway) and objects present in the driving environment as perceived by at least one sensor. Thus, the observation is generally a group of one or more data that can be processed into a derived determination about the environment.

The control module 220, in one embodiment, controls respective sensors of the vehicle 100 to provide the data inputs in the form of the data 250. The control module 220 may further process the data 250 into separate observations of the surrounding environment. For example, the control module 220, in one approach, fuses data from separate sensors to provide an observation about a particular aspect of the surrounding environment. By way of example, the sensor data 250 itself, in one or more approaches, may take the form of separate images, radar returns, LiDAR returns, and so on. The control module 220 may derive determinations (e.g., location, pose, characteristics, etc.) from the data 250 and fuse the data for separately identified aspects of the surrounding environment, such as surrounding vehicles, pedestrians, and so on. The control module 220 may further extrapolate the data 250 into an observation by, for example, correlating the separate instances of the sensor data 250 into a meaningful observation about an object beyond an instantaneous data point. For example, the control module 220 may track a pedestrian over many data points to provide an indication of a trajectory. In one arrangement, the control module 220 applies a vision model to images in the sensor data 250 to extract features representing objects and other aspects depicted in the images. In a similar manner, the control module 220 can process other types of data (e.g., radar, LiDAR, etc.) into features and then merge the features together that represent the same elements.

Additionally, while the control module 220 is discussed as controlling the various sensors to provide the sensor data 250, in one or more embodiments, the module 220 can employ other techniques that are either active or passive to acquire the sensor data 250. For example, the control module 220 may passively sniff the sensor data 250 from a stream of electronic information provided by the various sensors or other modules/systems in the vehicle 100 to further components within the vehicle 100. Moreover, the sensor data 250 may include information about the vehicle 100 itself, such as a location, a speed, and so on. Thus, the sensor data 250, in one embodiment, represents a combination of perceptions acquired from multiple sensors.

Of course, depending on the sensors that the vehicle 100 or another entity includes, the available sensor data 250 that the risk system 170 can harvest may vary. As one example, according to a particular implementation, the vehicle 100 may include different types of cameras or placements of multiple cameras. When acquiring the sensor data 250, the control module 220 may acquire various electronic inputs that originate from the vehicle 100, which may be stored in the data store 240 of the risk system 170 as the sensor data 250 and processed according to various algorithms, such as machine learning algorithms, heuristics, and so on. Accordingly, the risk system 170, in one approach, uses the noted sensor data 250 to assess risks.

Figure 4:
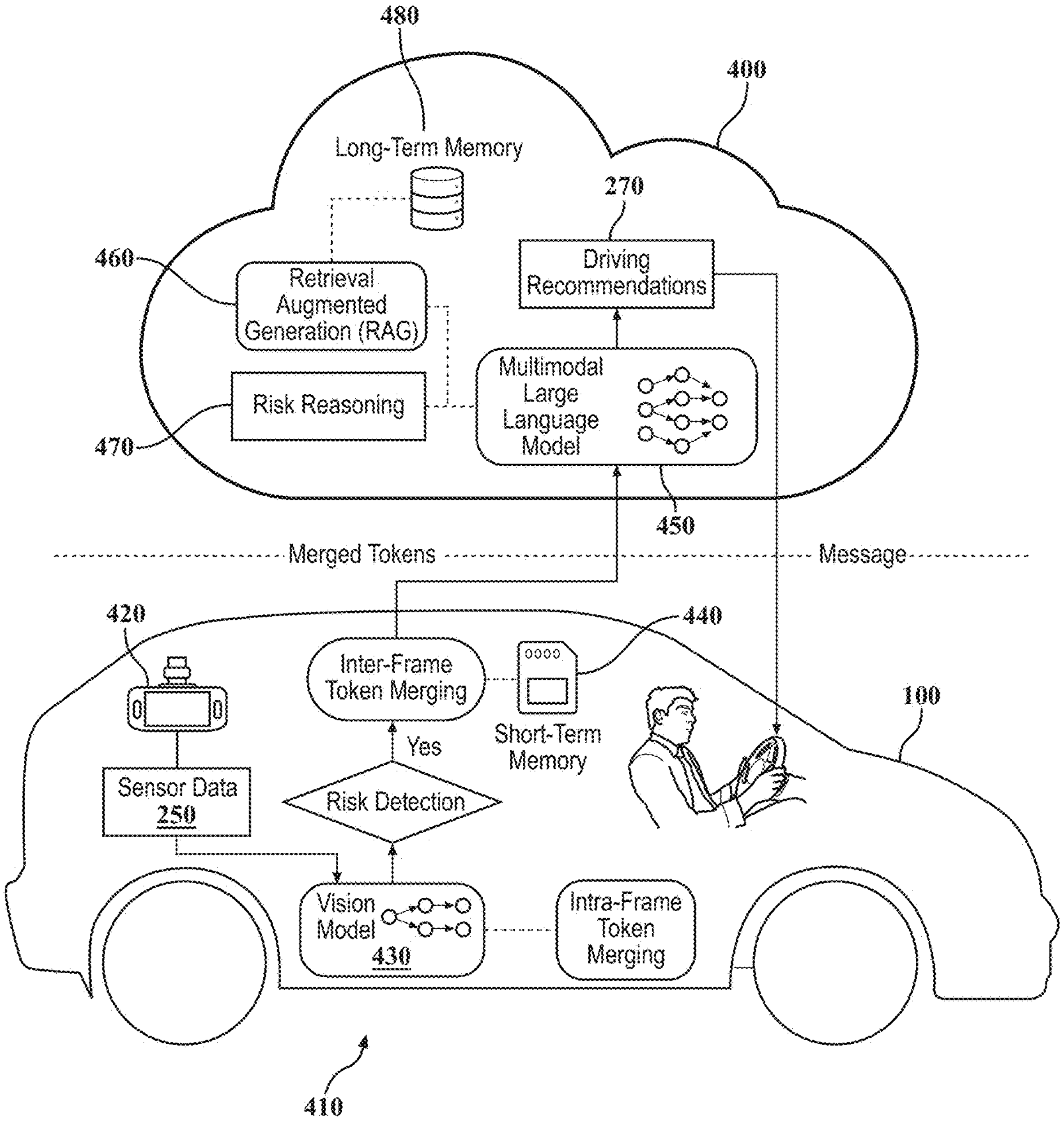
FIG. 4 is a system diagram illustrating one embodiment of a cloud-side instance and a vehicle-side instance of the risk system of FIG. 2.

While maintaining reference to FIG. 2, further consider FIG. 4, which illustrates a cloud-side instance 400 and a vehicle-side instance 410 of the risk system 170. Thus, the control module 220 includes instructions to acquire the sensor data 250 from at least one camera 420. Initially, the control module 220 processes the sensor data 250 on the vehicle-side instance 410 using one or more of the models 260, which may include a vision foundation model 430. In general, the control module 220 functions to apply the models 260 to the sensor data 250 in order to extract features therefrom. Thus, the models 260 used to process the sensor data 250 may include a vision transformer (VT), as the vision foundation model 430, that extracts rich visual features and encodes the features into a sequence of tokens representing the driving scene. It should be appreciated that, in further arrangements, the vision foundation model 430 may take different forms, such as a convolutional neural network (CNN), a visional language model (VLM), and so on.

The extracted features/tokens represent relevant objects, spatial relationships between the objects, and semantics of the overall scene. It should be noted that the use of terms feature and token as used herein are generally interchangeable with the tokens simply representing discrete features encoded in a form to standardize the features for processing. Moreover, it should be appreciated that while images and a vision model are described, in further approaches, the sensor data 250 may include other modalities and, thus, the control module 220 may apply a different model from the models 260 to process the separate modalities of information into features.

In any case, the control module 220 further includes instructions to merge tokens for common aspects represented in the scene. That is, redundant tokens for the same features are combined in order to reduce the amount of data for representing the current frame of the scene. This intra-frame token merging involves, in one approach, using a token merging method, which may be implemented within the vision model itself. In particular, the intra-frame token merging (i.e., within the same observation) leverages the built-in nature of key vectors in attention layers of the vision model to combine redundant tokens. The control module 220 may implement a multi-step process to perform the intra-frame token merging.

The multi-step process can include i) partitioning the tokens into two sets A and B that are substantially the same in size and then ii) merging similar tokens between the two sets. The process of merging similar tokens, in one approach, involves drawing an edge from each token in A to a most similar token in B, which may be measured using cosine similarity on key values. The control module 220 will then maintain the r most similar edges, where r is, for example, a predefined value. The control module 220 then merges tokens that are connected after maintaining the number r most similar edges and the two sets are concatenated back together. This process of intra-frame token merging selectively combines tokens, thereby providing a compact representation of the scene while preserving information. Overall, performing the intra-frame token merging improves computational costs and bandwidth requirements.

As shown in FIG. 4, the risk system 170 then makes an assessment about the risk of a current scene. That is, the control module 220 then processes the output of the vision model 430 using, in at least one approach, a risk detection model from the models 260. In general, the risk detection model assesses if there are potential hazards or concerning situations in real-time. The risk detection model may be trained to conduct binary classification, which is a basic determination of whether or not there is a risk present. Thus, the risk detection model may act as an initial filter before offloading the tokens to the cloud-based instance 400 for more intensive processing. In one or more arrangements, the risk system 170 may define the risk broadly in order to capture more instances and err on the side of providing the driving recommendation. For example, the risk system 170 may define the risk as any occurrence in the surrounding environment that causes the vehicle 100 (i.e., a driver or automated system) to adjust control of the vehicle 100. This may include braking, steering, accelerating, and so on. Of course, in further arrangements, the risk system 170 may define the risk differently, such as an occurrence that relates to the explicit safety of the vehicle 100 (e.g., time-to-collision less than 0.2 s, emergency maneuvers, etc.). Whichever approach is undertaken, the risk system 170 uses the initial assessment as a filter to determine when to involve the cloud-based instance 400.

Accordingly, when the control module 220 determines that a risk is present according to the risk detection model, then the control module 220 communicates the tokens to the cloud-based instance 400. However, first, in at least one arrangement, the control module 220 performs inter-frame token merging. That is, in addition to merging tokens within the same frame, the control module 220 can also merge tokens between different frames. This inter-frame merging further condenses the visual representation over time. In general, inter-frame merging exploits temporal redundancy between consecutive frames in a video stream by leveraging key values in the last transformer block layer when processing individual image frames of a video stream. The control module 220, in one approach, implements inter-frame token merging in a similar manner as intra-frame token merging. For example, the control module 220 applies inter-frame merging across adjacent frames where tokens for a prior frame are stored in a short-term memory 440. Thus, the control module 220 defines, for example, set A as being the tokens from a prior frame and set B as being the tokens from the current frame. The control module 220 can then merge the two sets to generate a condensed representation that captures key information (e.g., visual information) over a short temporal window (e.g., a few seconds). The control module 220 may store the merged tokens in the short-term memory 440, thereby providing a concise and informative representation of the driving scene.

The control module 220 then communicates the condensed representation to the cloud-based instance 400 for further processing. The control module 220 within the cloud-based instance 400 leverages a multimodal large language model (MLLM) 450 to process the merged tokens into the driving recommendations 270 that are communicated back to the vehicle 100 for use within a display or other system therein. The MLLM, in at least one arrangement, includes multiple components, such as a retrieval augmented generation (RAG) component 460 and a risk reasoning component 470. In one or more approaches, the MLLM 450 is a machine-learning model that is trained on text and visual data to permit the MLLM 450 to understand and reason about complex driving scenarios. The MLLM 450 uses the tokens along with information retrieved by the RAG component 460 to perform deep risk assessment and generate the driving recommendations 270.

The risk reasoning component 470 is a subcomponent of the MLLM 450 that functions through chain-of-thought (CoT) reasoning to guide the MLLM 450 through the risk analysis of the present scene. The control module 220 implements the CoT reasoning as part of the MLLM 450 to guide generation of prompts to the MLLM 450. The prompts serve as a structured framework for querying the MLLM 450 about various aspects of the driving situation, including potential risks, necessary driver actions, and possible scenario evolution (i.e., likely ongoing changes in the scene). By breaking down the analysis into a series of targeted questions, the CoT reasoning enables the MLLM 450 to perform step-by-step reasoning that considers different facets of the scenario, thereby generating more coherent and reliable risk assessments and recommendations.

In general, the prompts are not rigid or hard-coded. Instead, the control module 220 implements the CoT reasoning as a flexible and adaptive framework that allows the risk system 170 to dynamically adjust inquiries based on the specific context of a driving scene embodied in the condensed representation of merged tokens. In this way, the MLLM 450 is able to address a wide range of scenarios effectively and provide context-aware guidance. For example, the MLLM 450 can significantly enhance ADAS by adding advanced reasoning and contextual understanding. That is, ADAS systems tend to be reactive to immediate hazards, but the MLLM 450 uses the CoT reasoning to break down scenarios, predict future developments, and provide proactive, detailed recommendations. The MLLM 450 integrates diverse data inputs, including real-time and historical information (e.g., RAG component 460). The control module 220 uses the RAG component 460 to access a knowledge base of past occurrences that enhances the specificity and relevance of guidance to the MLLM 450.

The RAG component 460 leverages a long-term memory 480 as a comprehensive knowledge base for the driving recommendations 270. The long-term memory 480 stores a wide range of information relevant to driving scenarios, traffic rules, best practices, and personalized driving preferences. The data within the long-term memory 480 is organized as key-value pairs to facilitate efficient retrieval based on specific queries. The following are examples of key-value pairs that may be stored in the long-term memory 480 and are provided as an example. The examples should not be construed to be limit the different information that can be included therein.

Traffic Rules and Regulations: Key: "traffic_rules: location"; Value—textual description of traffic rules specific to a specified location, such as speed limits, right-of-way laws, parking regulations, etc.

Driving Best Practices: Key: "best_practices: Scenario"; Value—textual descriptions of recommended driving techniques and behaviors for different scenarios, such as merging, lane changing, handling intersections, and so on.

Vehicle Safety Features: Key: "safety_features: vehicle_model"; Value—information about safety features and capabilities of specific vehicle models, such as adaptive cruise control, lane centering, collision avoidance, etc.

Personalized Driving Preferences: Key: "driver_preferences: user_id"; Value—individual driver preferences for settings and behaviors, such as desired speed, following distance, route preferences, etc.

Accordingly, the control module 220 generates a query to retrieve relevant information from the long-term memory 480 using the RAG component 460 for a request from the vehicle 100 and according to the tokens and/or other information that is provided. The query is based on a current driving context/scene and can include factors such as location, road type, traffic conditions, driver identity, and so on. As one example, in a scenario where the vehicle 100 is approaching a busy intersection, the control module 220 may generate the query for the RAG component 460 as "traffic_rules:current_location"+"best_practices:intersection_navigation"+"driver_preferences:user_id". Thus, the control module 220 may form the queries as complex combinations of query terms that are specific to the current context.

The RAG component 460 uses the query to retrieve relevant key-value pairs from the long-term memory 480. In particular, the RAG component 460 employs, in at least one arrangement, a vector similarity search to find the best matches. Consequently, the control module 220 can process and integrate the retrieved results of key-value pairs with the merged tokens from the vehicle 100 to provide a comprehensive context for the MLLM 450. That is, using the RAG component 450 to retrieve the key-value pairs allows the MLLM 450 to consider information that is otherwise not available, including preferences (e.g., more cautious driving style) while also considering best practices, traffic rules, and so on. This permits the MLLM 450 to tailor the driving recommendations to the driver and the specific context. Moreover, while the control module 220 can provide this additional information in combination with the merged tokens, the risk reasoning component 470 can further leverage the CoT reasoning to generate a series of prompts to the MLLM 450 that facilitates further guidance of the MLLM 450 in generating the driving recommendation 270.

In any case, the cloud-based instance 400 of the risk system 170 can then provide the driving recommendation 270 back to the vehicle-side instance 410 of the risk system 170. The vehicle-side instance 410 is then able to provide an output embodying the driving recommendation 270. The particular form of the driving recommendation 270 may vary depending on the particular implementation and the context. For example, the control module 220 may generate natural language text that is provided in a visual form, an audible form, or a combination of both. The driving recommendation 270 provides guidance tailored to, for example, the configuration of the vehicle 100 relative to the level of automation.

For a configuration of the vehicle 100 that is manually controlled but may include automation level 0 to level 2, the control module 220 may generate the driving recommendation 270 to focus on supporting the driver with different suggestions. For example, the driving recommendations may include warnings about potential hazards, suggestions for safely navigating a scenario, a reminder about good driving practices, etc. Thus, in this arrangement, the control module 220 can generate the driving recommendation 270 in a human-understandable form, such as through spoken language that allows the risk system 170 to effectively communicate insights to the driver, thereby permitting the driver to make informed decisions and maintain safe driving habits.

Within the context of more automated vehicles, such as when the vehicle 100 implements automation of level three to level 5 according to the SAE standard, the risk system 170 can generate the driving recommendation 270 as explanations for actions of the automated systems of the vehicle 100. In this arrangement, the control module 220 can generate the driving recommendation 270 to clarify the reasoning behind automated maneuvers, to reassure the passengers about the safety and logic of the decisions from the automated systems, and so on. In general, the explanations facilitate the driver/passengers feeling more at ease and confident in a vehicle with automated functionality, even when the behavior of the automated system is unexpected or may seem unusual. In general, the control module 220 can present the driving recommendations in different ways, including as visual outputs on one or more displays, as audible outputs, as augmented reality (AR) outputs, and so on.

Figure 5:
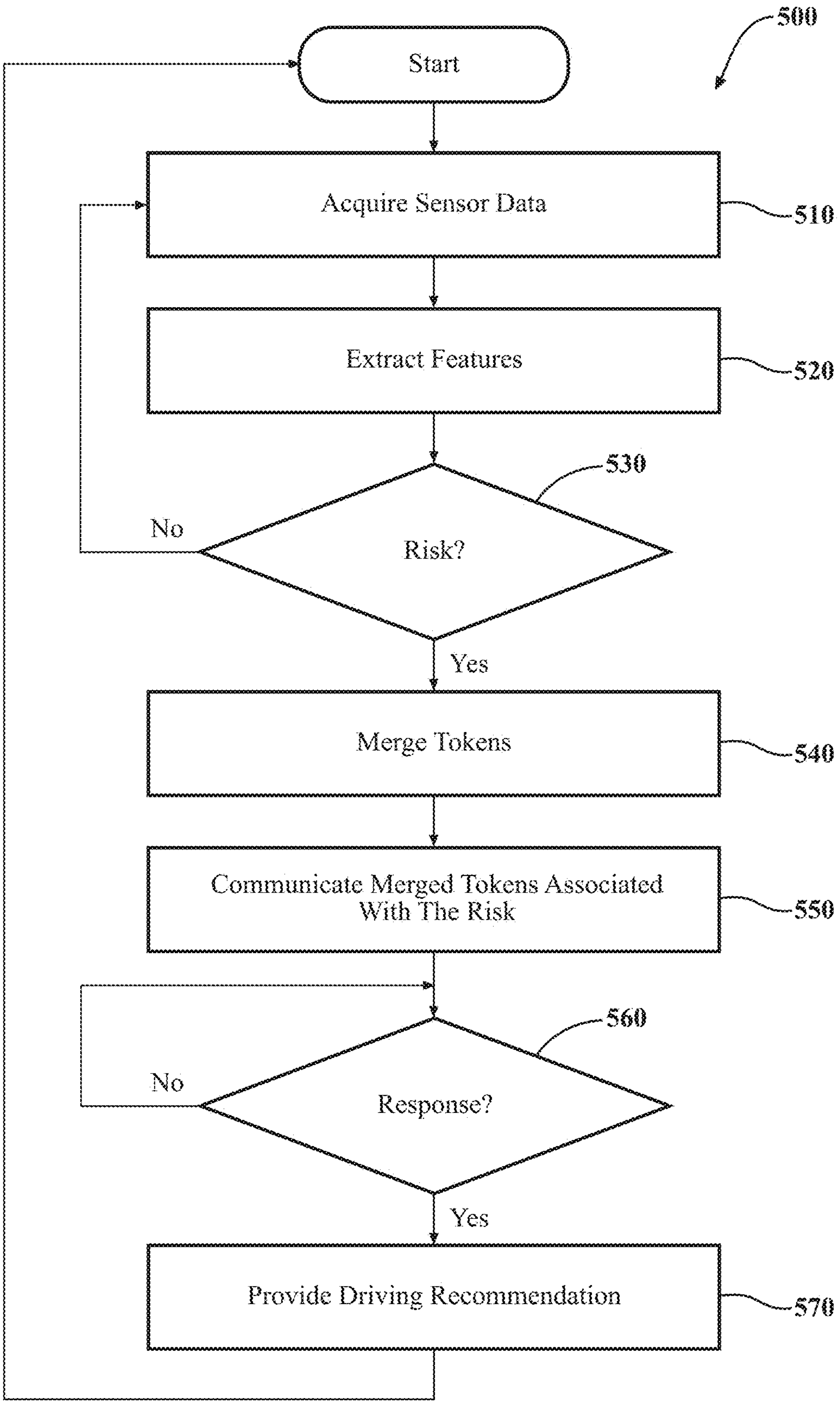
FIG. 5 is a flowchart illustrating one embodiment of vehicle-based determination of real-time risk.

Additional aspects about real-time risk assessment and providing recommendations will be described in relation to FIG. 5. FIG. 5 illustrates a flowchart of a method 500 that is associated with determining risks to a vehicle in order to provide driving recommendations. Method 500 will be discussed from the perspective of the risk system 170 of FIGS. 1-2. While method 500 is discussed in combination with the risk system 170, it should be appreciated that the method 500 is not limited to being implemented within the risk system 170 but is instead one example of a system that may implement the method 500. Furthermore, while the method is illustrated as a generally serial process, various aspects of the method 500 can execute in parallel to perform the noted functions.

At 510, the control module 220 controls the sensor system 120 to acquire the sensor data 250. In one embodiment, the control module 220 controls the camera 126 of the vehicle 100 to observe the surrounding environment. Alternatively, or additionally, the control module 220 controls the camera 126 and the LiDAR 124 or another set of sensors to acquire the sensor data 250. As part of controlling the sensors to acquire the sensor data 250, it is generally understood that the sensors acquire the sensor data 250 of a region around the vehicle 100 with data acquired from different types of sensors generally overlapping in order to provide for a comprehensive sampling of the surrounding environment at each time step. In general, the sensor data 250 need not be of the exact same bounded region in the surrounding environment but should include a sufficient area of overlap such that distinct aspects of the area can be correlated. Thus, the control module 220, in one embodiment, controls the sensors to acquire the sensor data 250 of the surrounding environment.

Moreover, in further embodiments, the control module 220 controls the sensors to acquire the sensor data 250 at successive iterations or time steps. Thus, the risk system 170, in one embodiment, iteratively executes the functions discussed at blocks 510-530 to acquire the sensor data 250 and provide information therefrom. Furthermore, the control module 220, in one embodiment, executes one or more of the noted functions in parallel for separate observations in order to maintain updated perceptions. Additionally, as previously noted, the control module 220, when acquiring data from multiple sensors, may fuse the data together to form the sensor data 250 and to provide for improved determinations of detection, location, and so on.

At 520, the control module 220 extracts features from the sensor data 250 using one or more of the models 260. As previously noted, the features capture relevant objects, spatial relationships between the relevant objects, and semantics of the surrounding environment in order to represent a current scene. In at least one approach, as part of extracting the features, the control module 220 may also merge tokens/features within the same frame (i.e., an image). The process of intra-frame merging generally involves identifying similar features according to a defined metric and combining the features to condense the representation. Thus, the control module 220 is able to extract and condense the features to provide an efficient representation of the scene.

At 530, the control module 220 determines whether a risk is present in relation to the vehicle 100. For example, the control module 220, in one approach, identifies a risk by processing the extracted features using a risk detection model. The risk detection module can provide a binary determination of whether a risk is present in the surrounding environment. As previously noted, the risk system 170 can define the risk as an occurrence in the surrounding environment associated with driving the vehicle 100 that induces the driver and/or an automated system of the vehicle 100 to execute a maneuver to avoid the risk, which may include modifying control of the vehicle 100 from following a route. The route is simply, for example, an expected trajectory when traveling along a roadway between defined waypoints. Thus, when the control module 220 does not identify a risk, then the control module 220 returns to acquiring and processing the sensor data 250. Otherwise, the control module 220 proceeds with additional aspects of the method 500 as described at 540.

At 540, the control module 220 merges tokens that are features extracted from the sensor data into a condensed representation of a context of the surrounding environment. For example, as previously noted in relation to 520, the control module 220 can perform intra-frame merging along with extracting the features of a specific frame. Thus, at 540, the control module 220 can further operate to merge tokens between frames via inter-frame merging. The inter-frame merging operates in a similar manner as the intra-frame merging but defines sets of tokens according to the separate frames. In any case, merging the tokens provides a condensed representation that conserves bandwidth and computational resources when offloading the data to a cloud-based instance.

At 550, the control module 220 communicates the condensed representation to a remote cloud-based system. In one approach, the control module 220 uses a communication system 180 of the vehicle 100 to communicate the merged tokens to a separate instance of the risk system 170 that executes in a cloud-based environment. Because the cloud-based environment is not a mobile platform, the cloud-based instance intrinsically has greater resources to implement more complex and powerful routines that can derive the driving recommendation 270.

At 560, the control module 220 monitors for a response from the cloud-based instance. In general, the process of monitoring involves monitoring a register, buffer, or other electronic memory for the reception of a communication from the remote entity. The control module 220 generally monitors for the response until received and then may exit the monitoring to provide the driving recommendation 270 at 570.

At 570, the control module 220 provides the driving recommendation 270 according to the risk. That is, the cloud-based instance assesses the risk in relation to the context using one or more models (e.g., a MLLM) and the control module 220 then translates the driving recommendation 270 into an output that is provided within the vehicle 100. The driving recommendation 270 may take different forms depending on the level of automation of the vehicle 100. For example, when a vehicle is operating at least semi-autonomously (e.g., level 3 autonomy and above), the control module 220 provides an explanation of why the vehicle 100 performed an action. For example, the explanation may involve why the vehicle 100 applied the breaks when there is no immediately apparent collision hazard, why the vehicle 100 changed lanes, and so on.

Separately, the driving recommendation may include various suggestions to the driver when the vehicle 100 is operating at levels 0-2. For example, the driving recommendation 270 may communicate information to the driver about how to improve navigating the risk in a safe way, including warnings about objects, suggestions for controlling the vehicle 100, reminders about driving practices, and so on. In this way, the risk system 170 is able to improve control of the vehicle 100 and awareness on the part of the driver.

Figure 6:
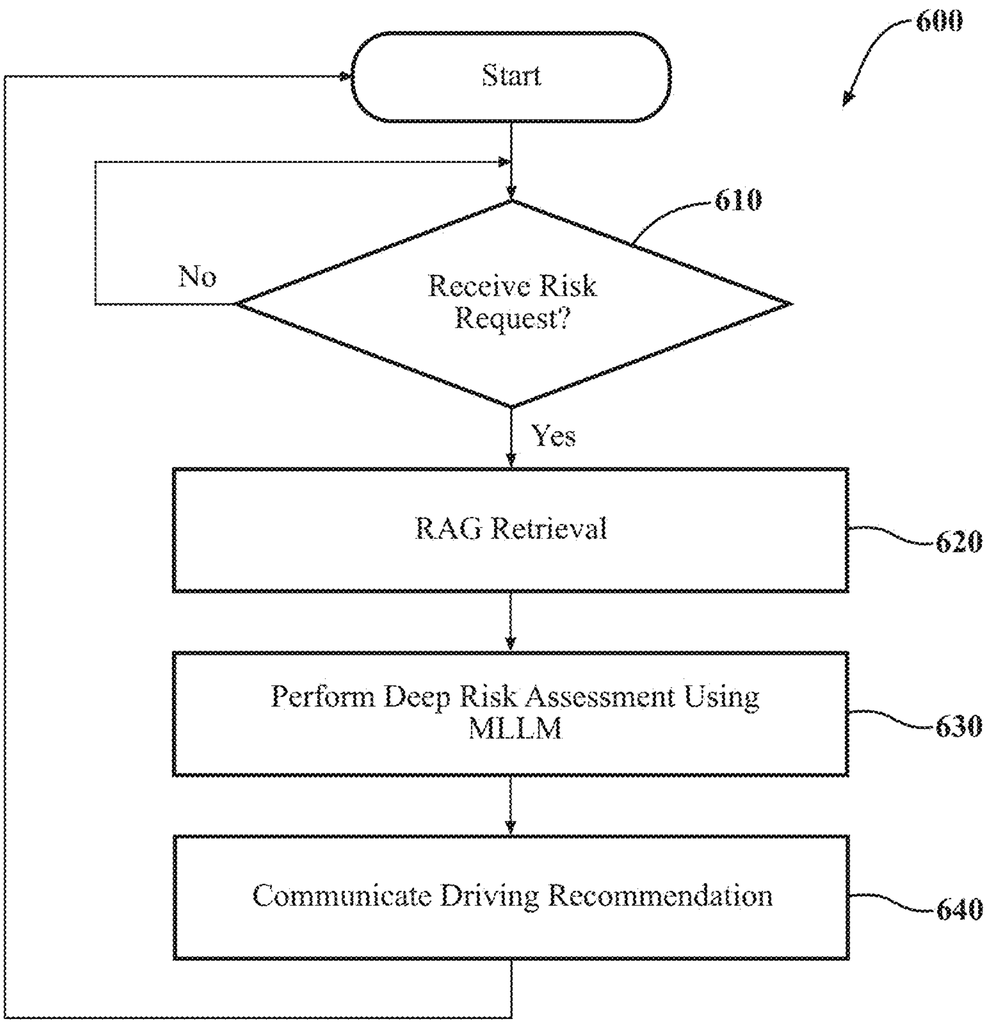
FIG. 6 is a flowchart illustrating one embodiment of cloud-based determinations using associated with risk observed by a vehicle.

FIG. 6 illustrates a flowchart of a method 600 that is associated with functions of a cloud-based instance of the risk system 170. Method 600 will be discussed from the perspective of the risk system 170 of FIG. 2. While method 600 is discussed in combination with the risk system 170, it should be appreciated that the method 600 is not limited to being implemented within the risk system 170 but is instead one example of a system that may implement the method 600. Furthermore, while the method is illustrated as a generally serial process, various aspects of the method 600 can execute in parallel to perform the noted functions.

At 610, the risk system 170 monitors for a request from the vehicle-side instance. Upon detecting reception of a request to assess the risk of a scene, the control module 220 transitions to processing the acquired tokens, as described at 620.

At 620, the control module 220 performs retrieval-augmented generation (RAG) to analyze the condensed representation of merged tokens. For example, the control module 220 uses contextual information from the request that may be in addition to the merged tokens to query a long-term memory implemented by the RAG. The long-term memory stores previous occurrences of risks along with, for example, best practices, user preferences, and other information that can inform the analysis about how to best proceed. The contextual information can include a location, a road type, traffic conditions, a driver identity, and other information that defines the scene. The query returns contextual information about the occurrence from the long-term memory, which the control module 220 may use to generate additional tokens. That is, the control module 220 integrates the information from the query as, for example, additional tokens with the tokens extracted from the sensor data 250 represented in the condensed representation. This information can then be used as input to the MLLM to better facilitate understanding by the MLLM in generating a response.

At 630, the control module 220 uses the MLLM (i.e., a recommendation model) to process the information from the RAG and the tokens from the vehicle-side instance. In one approach, the control module 220 provides inputs to the MLLM in the form of prompts or queries. The queries can be dynamic queries in that the control module 220 dynamically generate the queries based on the specific information from the scene and the contextual information retrieved by the RAG. As outlined previously, the control module 220 may implement Chain-of-Thought (CoT) reasoning as a series of structured dynamic queries to the recommendation model. Using this approach permits the control module 220 to guide the recommendation model in producing a more directed output that is the driving recommendation 270.

At 640, the control module 220 communicates the driving recommendation 270 back to the vehicle-side instance for output within the vehicle 100.

Figure 7:
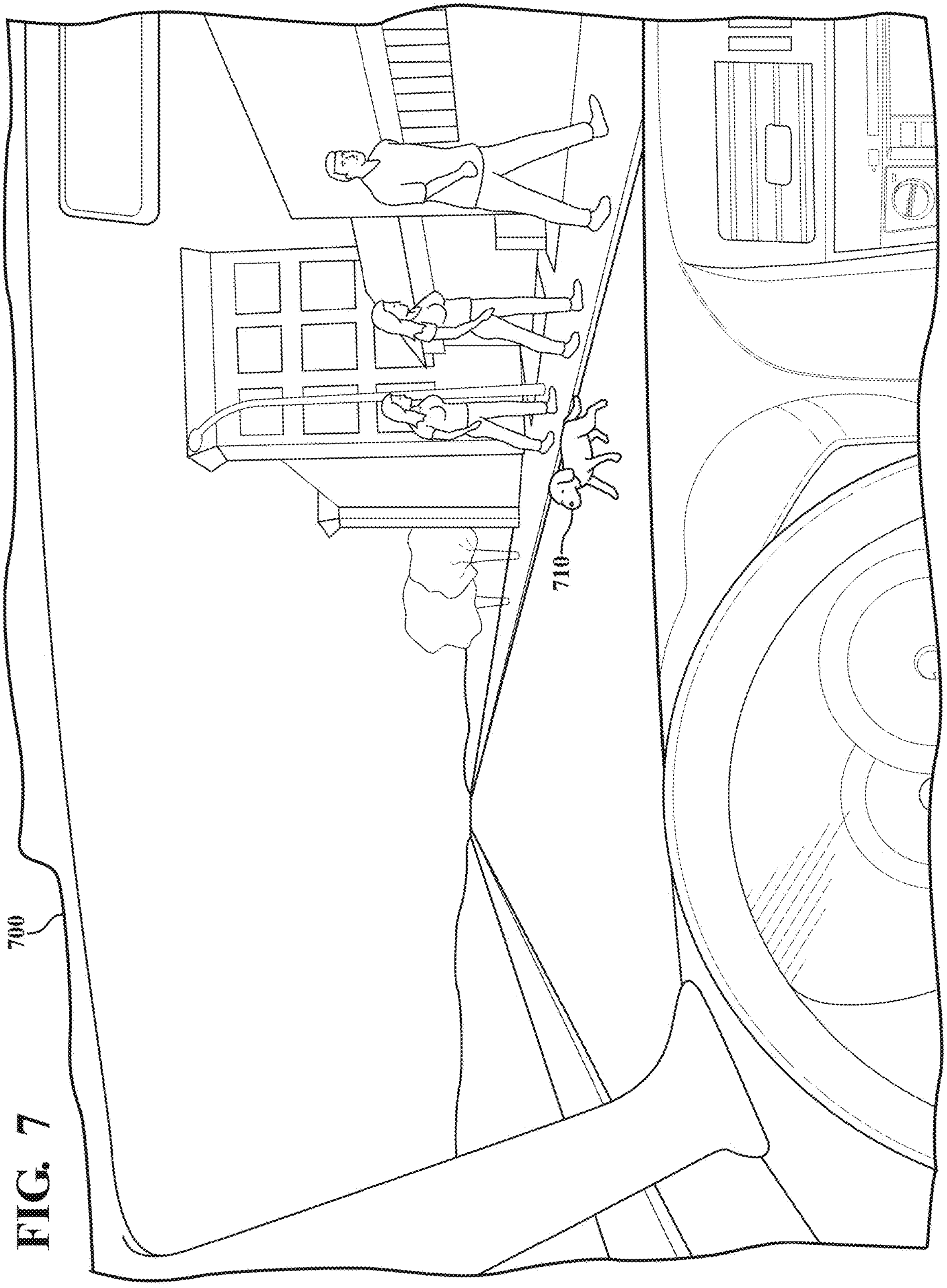
FIG. 7 illustrate an example scenario in which the risk system determines the risk and provides a driving recommendation.

With reference to FIG. 7, one example of a scenario 700 in which the risk system 170 may provide the driving recommendation 270 is shown. As illustrated in the scenario 700, the vehicle 100 is progressing along a roadway that is lined by a sidewalk and various businesses. In this context, different risks can be present, such as people running into the road, vehicles parking, and so on. In this case, a dog 710 breaks free and dashes into the roadway ahead of the progressing vehicle 100. Thus, a forward-facing camera of the vehicle 100 captures the risk of colliding with the dog 710. The risk system 170 processes the images into the tokens and analyzes the tokens using the risk detection model, which generates an output indicating the presence of the risk. Thus, the risk system 170 merges the tokens and communicates the condensed representation to the cloud-based instance for a deeper analysis. The cloud-based instance of the risk system 170 uses the context (i.e., location, driver preferences, etc.) to generate a query with the RAG component to the long-term memory. This can include retrieving information about the driver's preferences, best practices, rules for the specific location, and so on. Accordingly, the risk system 170 integrates this information with the tokens and further generates a series of prompts to the recommendation model (i.e., MLLM). As a result, the MLLM outputs a driving recommendation that is then communicated back to the vehicle 100. The vehicle-side instance of the risk system 170 can then provide the driving recommendation 270.

In a scenario where the vehicle 100 is manually controlled by the driver or includes automation up to, for example, certain ADAS systems (e.g., Level 2), the driving recommendation 270 may include displaying or emitting via audio suggested control behaviors or driving habits. For example, the risk system 170 may display a suggestion to slow down when pedestrians are present at the roadside. The risk system 170 may further provide an emergency alert to apply the brakes so as to avoid the dog 710. In a scenario where the vehicle 100 is automated at levels 3-5, the vehicle 100 may take action to avoid hitting the dog 710 without input from the driver. For example, if the dog 710 is present at the side of the road, then the vehicle 100 may swerve to the center and/or slow down or even stop. In this case, the driving recommendation 270 may explain that the risk of hitting the dog 710 caused the vehicle 100 to perform the maneuver. The risk system 170 may provide an infographic showing the location of the dog 710 relative to the vehicle 100 and an animation indicating that the dog 710 is likely to move into a path of the vehicle 100. In a further approach, the risk system 170 may provide an audible explanation that is spoken. In this way, the risk system 170 is able to improve the safety of the vehicle and awareness of the driver.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Of course, in further aspects, the vehicle 100 may be a manually driven vehicle that may or may not include one or more driving assistance systems, such as active cruise control, lane-keeping assistance, crash avoidance, and so on. In any case, "manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills, etc. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include various types of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the risk system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement, speed, maneuvering, heading, direction, etc. of the vehicle 100. The processor(s) 110, and/or the automated driving module(s) 160 may control some or all of these vehicle systems 140 and, thus, may be partially or fully autonomous.

The processor(s) 110, and/or the automated driving module(s) 160 can be operatively connected to communicate with the various vehicle systems 140 and/or individual components thereof. For example, returning to FIG. 1, the processor(s) 110, the risk system 170, and/or the automated driving module(s) 160 can be in communication to send and/or receive information from the various vehicle systems

140 to control the movement, speed, maneuvering, heading, direction, etc. of the vehicle 100. The processor(s) 110, the risk system 170, and/or the automated driving module(s) 160 may control some or all of these vehicle systems 140.

The processor(s) 110, and/or the automated driving module(s) 160 may be operable to control the navigation and/or maneuvering of the vehicle 100 by controlling one or more of the vehicle systems 140 and/or components thereof. For instance, when operating in an autonomous mode, the processor(s) 110, and/or the automated driving module(s) 160 can control the direction and/or speed of the vehicle 100. The processor(s) 110, and/or the automated driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, “cause” or “causing” means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the automated driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine the position and velocity of the vehicle 100. The automated driving module(s) 160 can determine the location of obstacles, obstacles, or other environmental features, including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the risk system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data. “Driving maneuver” means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, “cause” or “causing” means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A risk system, comprising:

one or more processors; and a memory communicably coupled to the one or more processors and storing:

a control module including instructions that, when executed by the one or more processors, cause the one or more processors to:

acquire sensor data about a surrounding environment of a vehicle;

responsive to identifying a risk to the vehicle from the sensor data, merge tokens that are features extracted from the sensor data into a condensed representation of a context of the surrounding environment associated with the risk; and provide a driving recommendation according to the risk, including instructions to perform retrieval-augmented generation (RAG) to analyze the condensed representation according to a long-term memory implemented by the RAG, the long-term memory storing previous occurrences of risks and the instructions to perform the RAG including instructions to query the long-term memory for contextual information about the surrounding environment, wherein the instructions to perform the RAG generate additional tokens for the contextual information and integrate the additional tokens with the tokens extracted from the sensor data.

2. The risk system of claim 1, wherein the control module includes instructions to identify the risk including instructions to identify the risk as an occurrence in the surrounding environment associated with driving the vehicle that induces a driver to execute a maneuver to avoid the risk, including modifying control of the vehicle from following a route, and wherein the control module includes instructions to identify the risk including instructions to communicate the condensed representation to a remote cloud-based system.

3. The risk system of claim 1, wherein the control module includes instructions to merge the tokens including instructions to merge redundant features using key vectors in attention layers of a context model according to a similarity metric to compress the features while preserving semantic information.

4. The risk system of claim 1, wherein the contextual information including at least a location, a road type, traffic conditions, and a driver identity.

5. The risk system of claim 1, wherein the control module includes instructions to provide the driving recommendation including instructions to determine the driving recommendation according to a dynamic query to a recommendation model based on the condensed representation of the features, wherein the control module includes instructions to determine the driving recommendation including instructions to generate the dynamic query using Chain-of-thought (CoT) reasoning as a series of structured queries to the recommendation model.

6. The risk system of claim 1, wherein the control module includes instructions to identify the risk includes extracting the features that capture relevant objects, spatial relationships between the relevant objects, and semantics of the surrounding environment, wherein the control module includes instructions to merge the tokens including instructions to combine features that represent same elements within a current frame and between frames to compress the features into the condensed representation.

7. The risk system of claim 1, wherein the control module includes instructions to provide the driving recommendation including instructions to provide an explanation of why the vehicle performed an action when the vehicle is operating at least semi-autonomously.

8. The risk system of claim 1, wherein the control module includes instructions to provide the driving recommendation including instructions to communicate information to a driver about how to improve navigating the risk in a safe way, the driving recommendation including one or more of warnings about objects, suggestions for controlling the vehicle, and a reminder about driving practices.

9. A non-transitory computer-readable medium storing instructions that, when executed by one or more processors, cause the one or more processors to:

acquire sensor data about a surrounding environment of a vehicle;

responsive to identifying a risk to the vehicle from the sensor data, merge tokens that are features extracted from the sensor data into a condensed representation of a context of the surrounding environment associated with the risk; and provide a driving recommendation according to the risk, including instructions to perform retrieval-augmented generation (RAG) to analyze the condensed representation according to a long-term memory implemented by the RAG, the long-term memory storing previous occurrences of risks and the instructions to perform the RAG including instructions to query the long-term memory for contextual information about the surrounding environment, wherein the instructions to perform the RAG generate additional tokens for the contextual information and integrate the additional tokens with the tokens extracted from the sensor data.

10. The non-transitory computer-readable medium of claim 9, wherein the instructions to identify the risk including instructions to identify the risk as an occurrence in the surrounding environment associated with driving the vehicle that induces a driver to execute a maneuver to avoid the risk, including modifying control of the vehicle from following a route, and wherein the instructions to identify the risk including instructions to communicate the condensed representation to a remote cloud-based system.

11. The non-transitory computer-readable medium of claim 9, wherein the instructions to merge the tokens include instructions to merge redundant features using key vectors in attention layers of a context model according to a similarity metric to compress the features while preserving semantic information.

12. The non-transitory computer-readable medium of claim 11, wherein the contextual information about the surrounding environment including at least a location, a road type, traffic conditions, and a driver identity.

13. A method, comprising:

acquiring sensor data about a surrounding environment of a vehicle;

responsive to identifying a risk to the vehicle from the sensor data, merging tokens that are features extracted from the sensor data into a condensed representation of a context of the surrounding environment associated with the risk; and providing a driving recommendation according to the risk, including performing retrieval-augmented generation (RAG) to analyze the condensed representation according to a long-term memory implemented by the RAG, the long-term memory storing previous occurrences of risks and performing the RAG including querying the long-term memory for contextual information about the surrounding environment, wherein performing the RAG generates additional tokens for the contextual information and integrates the additional tokens with the tokens extracted from the sensor data.

14. The method of claim 13, wherein identifying the risk includes identifying the risk is an occurrence in the surrounding environment associated with driving the vehicle that induces a driver to execute a maneuver to avoid the risk, including modifying control of the vehicle from following a route, and wherein identifying the risk includes communicating the condensed representation to a remote cloud-based system.

15. The method of claim 13, wherein merging the tokens includes merging redundant features using key vectors in attention layers of a context model according to a similarity metric to compress the features while preserving semantic information.

16. The method of claim 13, wherein the contextual information about the surrounding environment including at least a location, a road type, traffic conditions, and a driver identity.

17. The method of claim 13, wherein providing the driving recommendation includes determining the driving recommendation according to a dynamic query to a recommendation model based on the condensed representation of the features, wherein determining the driving recommendation includes generating the dynamic query using Chain-of-thought (CoT) reasoning as a series of structured queries to the recommendation model.

18. The method of claim 13, wherein identifying the risk includes extracting the features that capture relevant objects, spatial relationships between the relevant objects, and semantics of the surrounding environment, wherein merging the tokens includes combining features that represent same elements within a current frame and between frames to compress the features into the condensed representation.

19. The method of claim 13, wherein providing the driving recommendation includes providing an explanation of why the vehicle performed an action when the vehicle is operating at least semi-autonomously.

20. The method of claim 13, wherein providing the driving recommendation includes communicating information to a driver about how to improve navigating the risk in a safe way, the driving recommendation including one or more of warnings about objects, suggestions for controlling the vehicle, and a reminder about driving practices.

* * * * *